United States Patent [19]

Becker et al.

[11] Patent Number: 4,883,242

[45] Date of Patent: Nov. 28, 1989

[54] PACKING SACK FOR A LIFE JACKET AND ITS EASY ACCESS STORAGE, ESPECIALLY IN AN AIRCRAFT

[75] Inventors: Reinhard Becker; Bruno Jansa, both of Hamburg, Fed. Rep. of Germany

[73] Assignee: Messerschmitt-Boelkow-Blohm GmbH, Bremen, Fed. Rep. of Germany

[21] Appl. No.: 123,862

[22] PCT Filed: Feb. 14, 1987

[86] PCT No.: PCT/DE87/00052

§ 371 Date: Dec. 7, 1987

§ 102(e) Date: Dec. 7, 1987

[87] PCT Pub. No.: WO87/04990

PCT Pub. Date: Aug. 27, 1987

[30] Foreign Application Priority Data

Feb. 15, 1986 [DE] Fed. Rep. of Germany ....... 3604857

[51] Int. Cl.⁴ ............................................. B64D 13/00
[52] U.S. Cl. .................................................. 244/118.5
[58] Field of Search .................. 244/118.5; 441/80, 88

[56] References Cited

U.S. PATENT DOCUMENTS

| | | | |
|---|---|---|---|
| 3,675,257 | 7/1972 | Haglund et al. | 441/80 |
| 3,754,291 | 8/1973 | Harris | 441/80 |
| 4,154,237 | 5/1979 | Courter | 244/118.5 |
| 4,481,945 | 11/1984 | Levine . | |
| 4,498,879 | 2/1985 | Burr | 441/88 |
| 4,560,356 | 12/1985 | Burr | 441/88 |
| 4,609,166 | 9/1986 | Brennan | 244/118.5 |
| 4,627,587 | 12/1986 | McCutchan et al. | 244/118.5 |

FOREIGN PATENT DOCUMENTS

| | | |
|---|---|---|
| 147376 | 3/1985 | European Pat. Off. . |
| 1277959 | 6/1972 | United Kingdom ................. 441/88 |

Primary Examiner—Sherman D. Basinger
Assistant Examiner—Stephen P. Avila
Attorney, Agent, or Firm—W. G. Fasse; D. H. Kane, Jr.

[57] ABSTRACT

A packing sack or bag for holding a life jacket, providing an easy access thereto, preferably in an aircraft, has the shape of a hose with an open end (6) and a closed end (7). The closed end (7) forms a tab (8) to receive at least one securing element (9). A rip cord (14) fixed at one point (17) situated approximately at the middle of the length of the bag (2, 3, 4) and surrounding the extremity of the folded life jacket (16) turned to the side of the open end (6) of the bag (2, 3, 4), extends along the inner surface of the bag (2, 3, 4) and comes out through its open end (6). The bag may be directly suspended from a wall or a ceiling or may be placed into a container (1). The main advantage of such a packing sack is that the required manipulation to grab the life jacket (16) may be easily executed by a single hand.

13 Claims, 7 Drawing Sheets

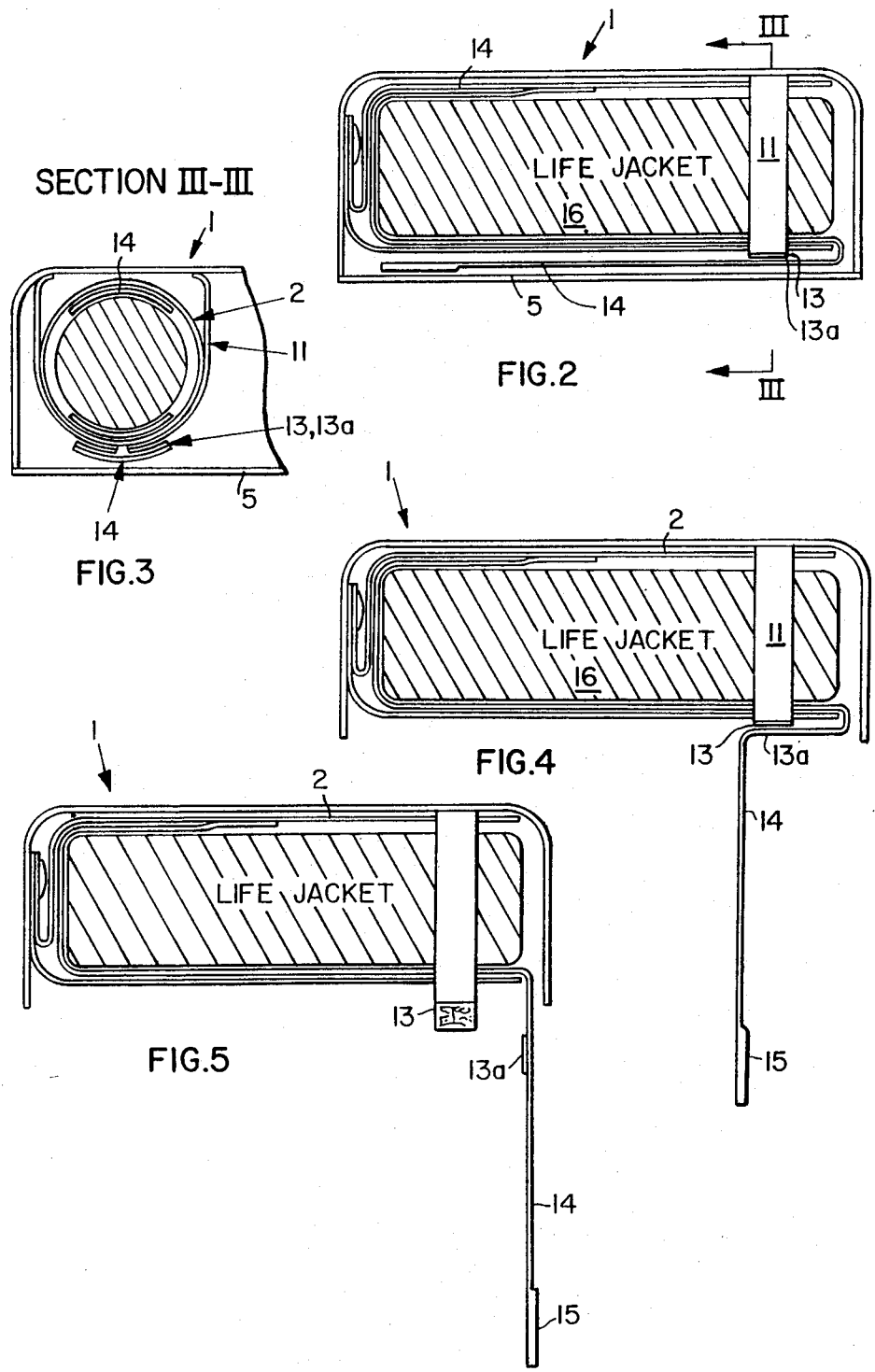

PACKING SACK FOR A LIFE JACKET AND ITS EASY ACCESS STORAGE, ESPECIALLY IN AN AIRCRAFT

FIELD OF THE INVENTION

The invention relates to a packing sack according to the preamble of claim 1.

DESCRIPTION OF THE PRIOR ART

A known packing sack of this type is arranged below each passenger seat of an aircraft. If the life jacket is to be used, the passenger must take the life jacket which is inside the packing sack, out of the storage space below the seat and open the packing sack before he can remove and put on the life jacket. The packsack is made of a fabric or of a synthetic film. For a dust-free storage of the life jacket, the sack is closed by sewing or welding, whereby the respective seams can be opened, however, without a large force application. Nevertheless, it is a disadvantage that for the unpacking of a life jacket several manipulations are required which can be performed by both hands only. This is a disadvantage to the handicapped. Additionally, in case of emergency there is the danger that less dexterous passengers might panic if the trouble-free unpacking of the life jacket does not succeed immediately. Another disadvantage of this solution resides in that it is very easy to steal life jackets without detection.

In connection with another known solution intended to prevent the undetected removal of life jackets, these life jackets are stored in an overhead container above the passenger seats. When necessary, the container is tilted downwardly for the removal of the life jackets. In this way, the safety against theft is substantially increased due to the overhead arrangement. However, the handling of this arrangement is rather cumbersome. Additionally, possible escape routes may be made narrower by the downwardly tilted containers so that in case of an emergency a simple application of the life jackets and a trouble-free evacuation of the aircraft are not possible.

OBJECTS OF THE INVENTION

Accordingly, it is the object of the invention to construct a packing sack as mentioned in the preamble in such a way and to arrange it in such a way that the removal and unpacking of a life jacket can be performed with very few manipulations that can be done by one hand only.

Further, the invention has for a secondary object to construct a packing sack as mentioned in the preamble in such a way and to arrange it in such a way that an undetected removal of the life jackets is prevented.

SUMMARY OF THE INVENTION

The above objects are achieved in a packing sack according to the preamble by the characterizing features of claim 1. Advantageous further embodiments of the invention are defined in the dependent claims.

The thus achieved advantages reside in that the manipulations necessary for the pull-out of the life jackets are simplified, whereby possibly human lives can be saved. Further, the packing sack according to the invention has the advantage that an undetected removal of the life jackets is practically no longer possible.

BRIEF DESCRIPTION OF THE DRAWINGS

The invention is illustrated in the drawings and it is explained in the description of the example embodiments, wherein:

FIG. 2 shows the container according to FIG. 1, in section;

FIG. 3 shows the section III—III in FIG. 2;

FIG. 4 shows the container according to FIG. 1, in its opened state;

FIG. 5 shows the container of FIG. 4 with the operated rip cord;

DETAILED DESCRIPTION OF PREFERRED EXAMPLE EMBODIMENTS AND OF THE BEST MODE OF THE INVENTION

Figure 1:
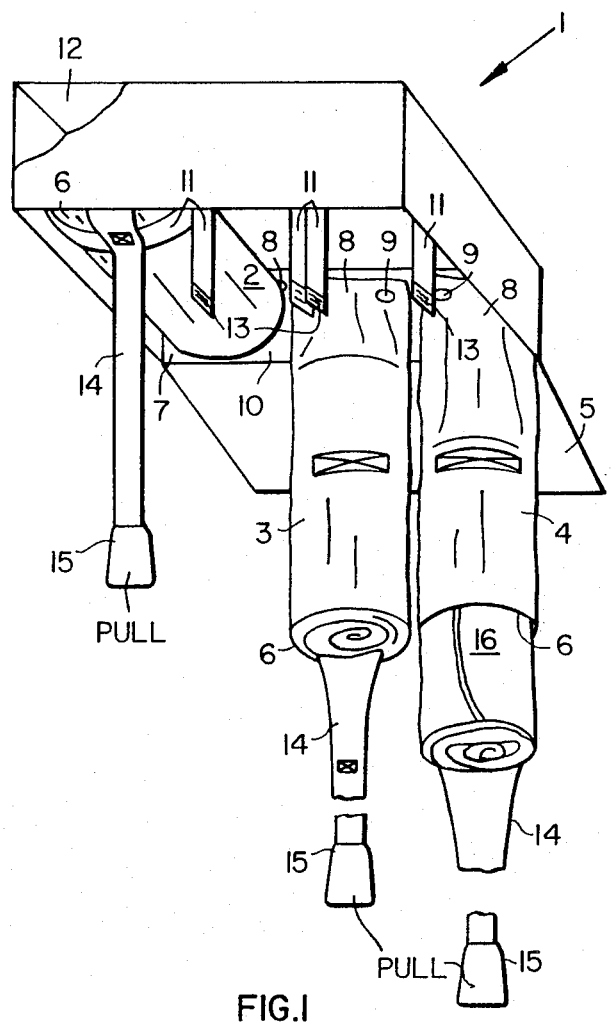
FIG. 1 shows a container 1 with three packing sacks.
Figure 6:
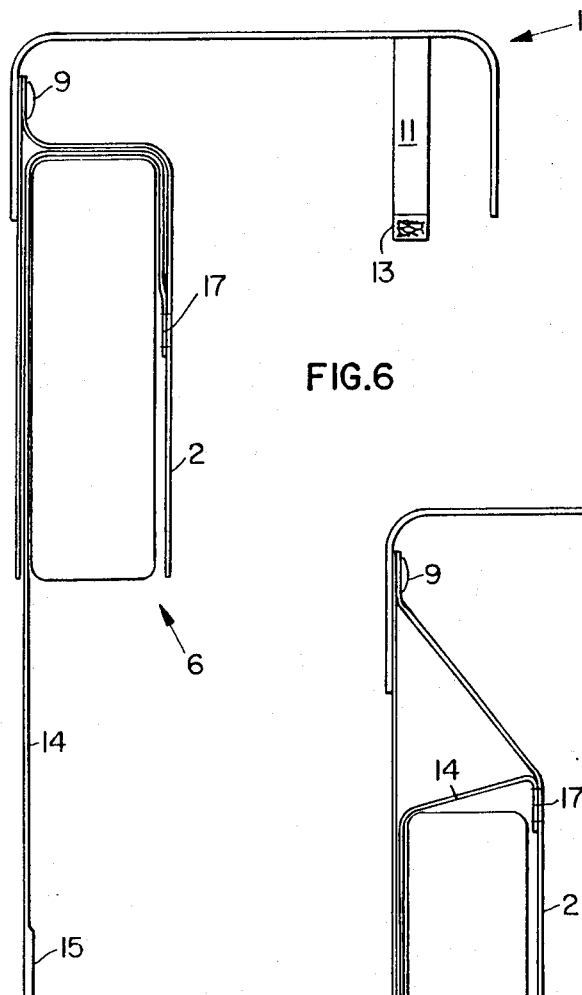
FIG. 6 shows the container of FIG. 5 with the packing sack tilted outwardly.
Figure 7:
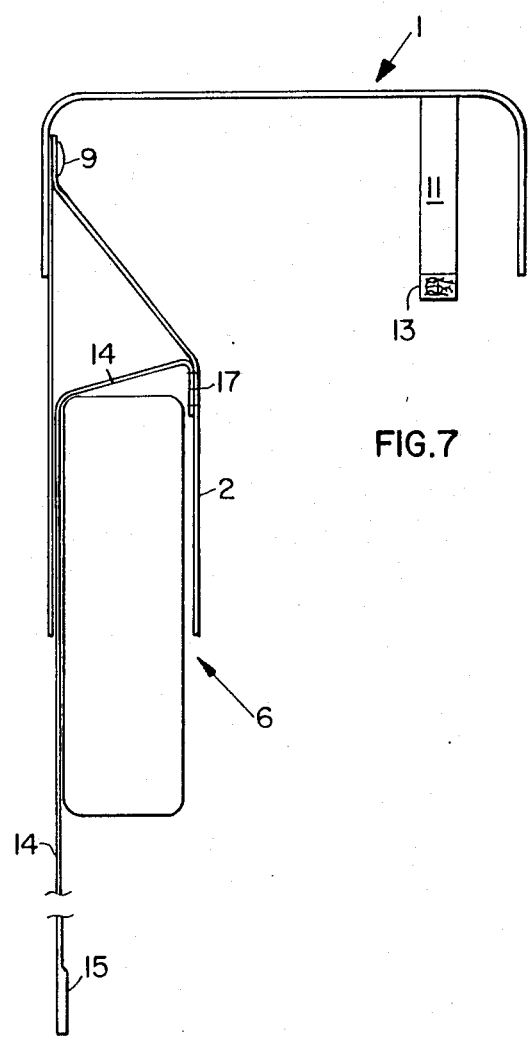
FIG. 7 shows the container according to FIG. 6 with the life jacket ready for take-out.

FIG. 1 shows a container 1 with three packing sacks 2, 3, and 4. The container 1 constructed as an overhead embodiment is located above the passenger seats and comprises on its underside a flap 5. The packing sacks are hose shaped with an open end 6 and a closed end 7. In an emergency the respective passenger opens the flap 5. Thereafter, the life jackets folded and rolled into packets are in the position of the packing sack 2. The closed end of each packing sack 2, 3, and 4 has a tab 8 which is secured through snap buttons 9 to the inner wall 10 of the container 1. The respective open end is secured through a holding band 11 so that nothing can fall out. The band 11 is solidly connected with the upper wall 12 of the container 1. The free ends of the band 11 are each provided with a surface type zipper 13 and connected to each other by a rip cord 14 which has, at the respective location, a corresponding zipper counter member. As soon as the flap 5 is opened, the rip cord 14 with the handle 15 falls out of the container 1 and assumes the shown position in connection with the packing sack 2. Thus, the rip cord 14 is within the reach of the passenger for whom the respective life jacket is intended. By pulling the rip cord 14 the zippers 13 are opened so that the respective packing sack can be tilted out of the container 1 to assume the position according to packing sack 3. In this position the folded life jacket 16 cannot fall out of the packing sack due to friction, even though the sack is open at the bottom. Only by further pulling of the rip cord 14 into a defined end position is it possible to pull the life jacket 16 out of the packing sack 4 all the way into an end position defined by the rip cord 14 as is shown by the packing sack 4. Now it is possible to pull the life jacket 14 completely out of the packing sack by gripping the free unpacked end thereof. All manipulations required after the opening of the flap 5 can easily be performed by one hand.

FIGS. 2 to 7 show, for example, with reference to a packing sack 2 the arrangement of the sack according to the invention in connection with a container 1. In FIG. 2 the container 1 is shown in its normal position with the flap 5 closed. Here the container is shown in section along the packing sack 2 so that the latter appears in a plan view. The rip cord 14 is inside the container 1 and the surface type zipper 13 is closed with its counter member 13a. FIG. 3 shows the basically circular cross-section of the filled packing sack 2, said cross-section being due to the rolled up life jacket. In FIG. 4 the flap 5, not shown here, is in its opened state. The rip cord 14 hangs downwardly. The zipper 13/13a is still closed so that the position of the life jacket 16 is not changed. As soon as the zipper 13/13a is opened by pulling the rip cord 14 as shown in FIG. 5, the packing sack 2 tilts out of the container 1 to assume the position shown in FIG. 6. Since the packing sack 2 encloses the life jacket 16 tightly, the latter cannot fall out of the packing sack 2. The rip cord 14 is led around the upper end of the life jacket roll inside the packing sack 2. The rip cord 14 is sewn to the packing sack 2 in the center of the length of the packing sack 2 at the location 17. By further pulling the rip cord 14 the roller 16 is practically pushed, from its upper end, out of the packing sack until it reaches the end position shown in FIG. 7 which is determined by the seam location 17. The life jacket 16 can now be completely withdrawn from the packing sack 2 by gripping the lower ends of the jacket. Since the flap 5 closes tightly and since the open end 6 of the packing sack lies closely on the respective wall of the container 1, the life jacket 16 is stored in a sufficiently dust-tight manner.

Figure 8:
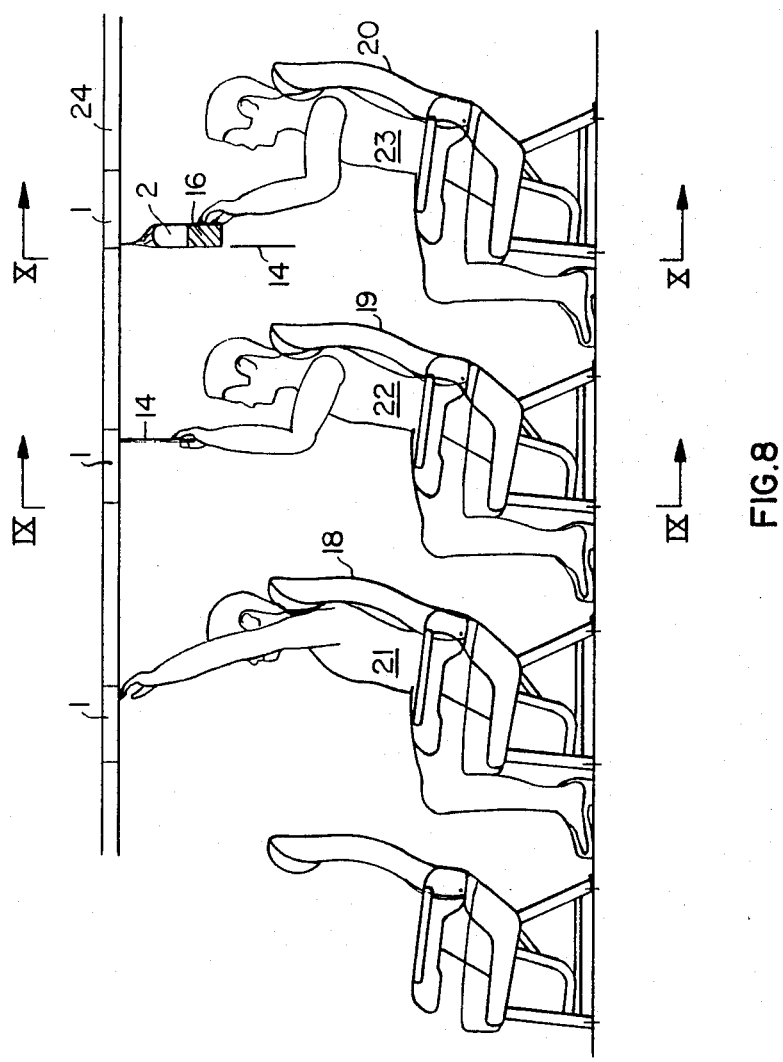
FIG. 8 shows an aircraft cabin.
Figure 9A:
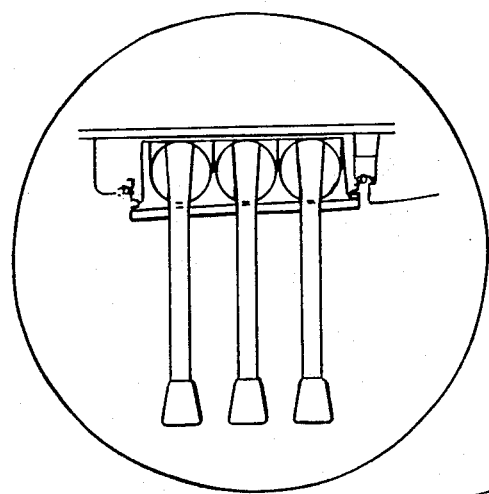
FIG. 9a shows the container of FIG. 9.
Figure 9:
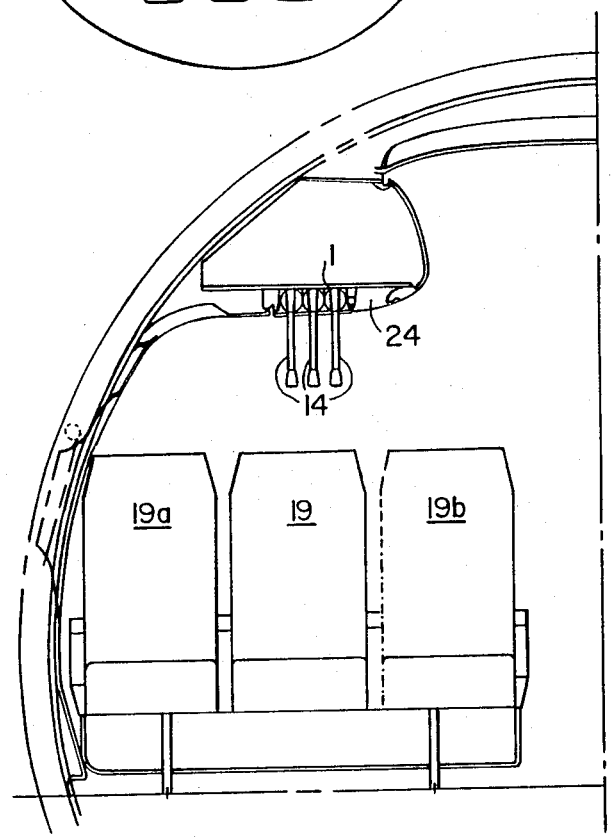
FIG. 9 shows the section IX—IX of FIG. 8.
Figure 10A:
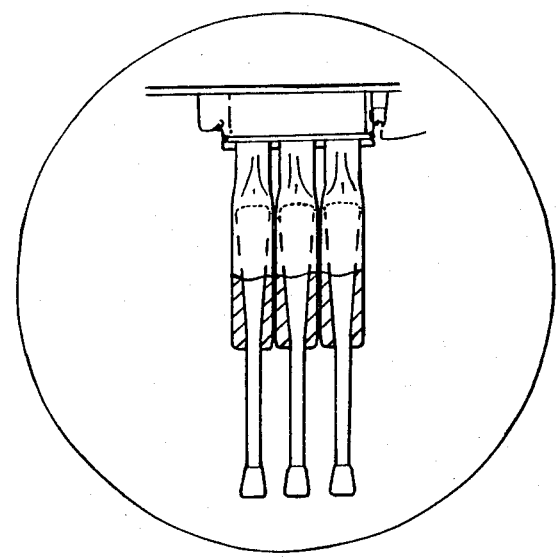
FIG. 10a shows the container of FIG. 10.
Figure 10:
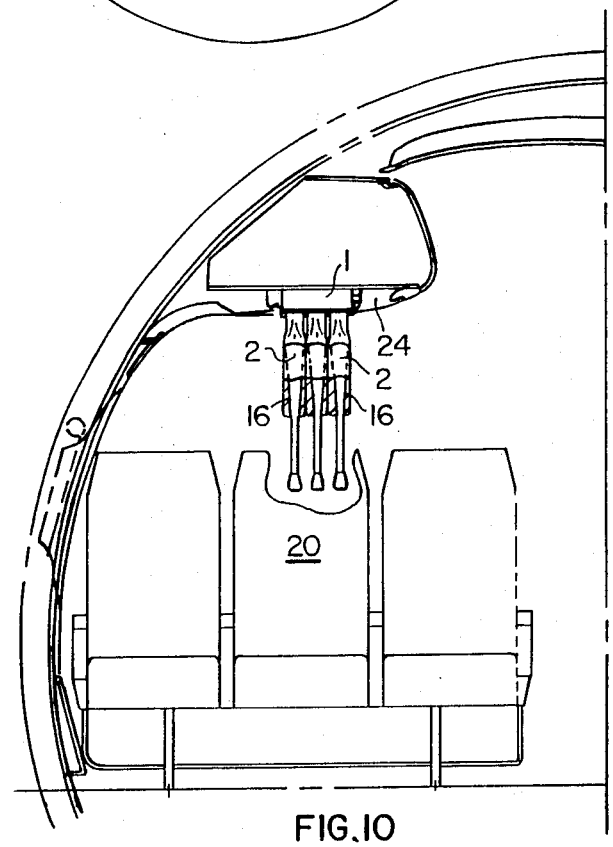
FIG. 10 shows the section X—X according to FIG. 8.

FIGS. 8 to 10 show an aircraft cabin with passenger seats 18, 19, 20 and passengers 21, 22, 23. The overhead containers 1 are arranged within an enclosure 24. As is apparent from passenger 21, the respective container 1 is within the reach of the corresponding passenger. The container 1 arranged above the passenger 22 is open. The flap 5 is not shown for simplicity's sake. The well visible rip cord can be pulled by the respective passenger 22 with one hand. Passenger 12 shows how the life jacket 16 is removed from the packing sack 2 after the rip cord has been pulled to its stop. The section according to FIG. 9 shows the arrangement of the container 1 relative to the cabin cross-direction.

Figure 13:
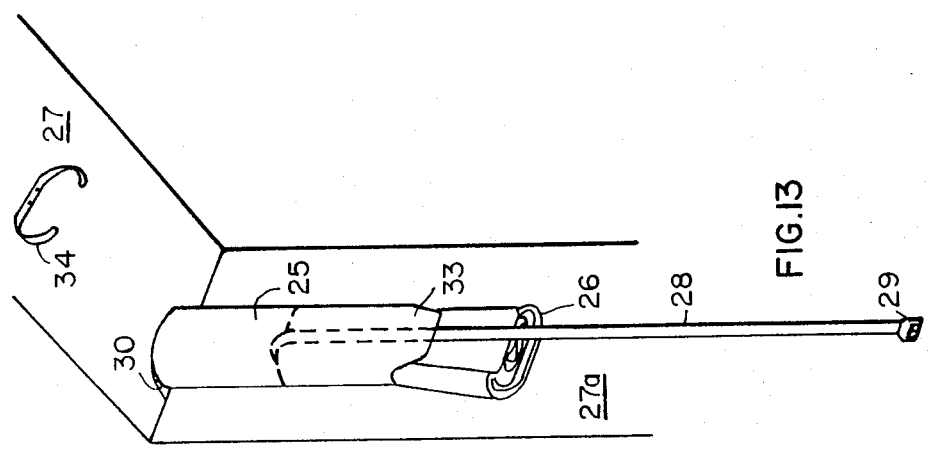
FIG. 13 shows the packing sack of FIG. 12 with the life jacket ready for take-out.
Figure 12:
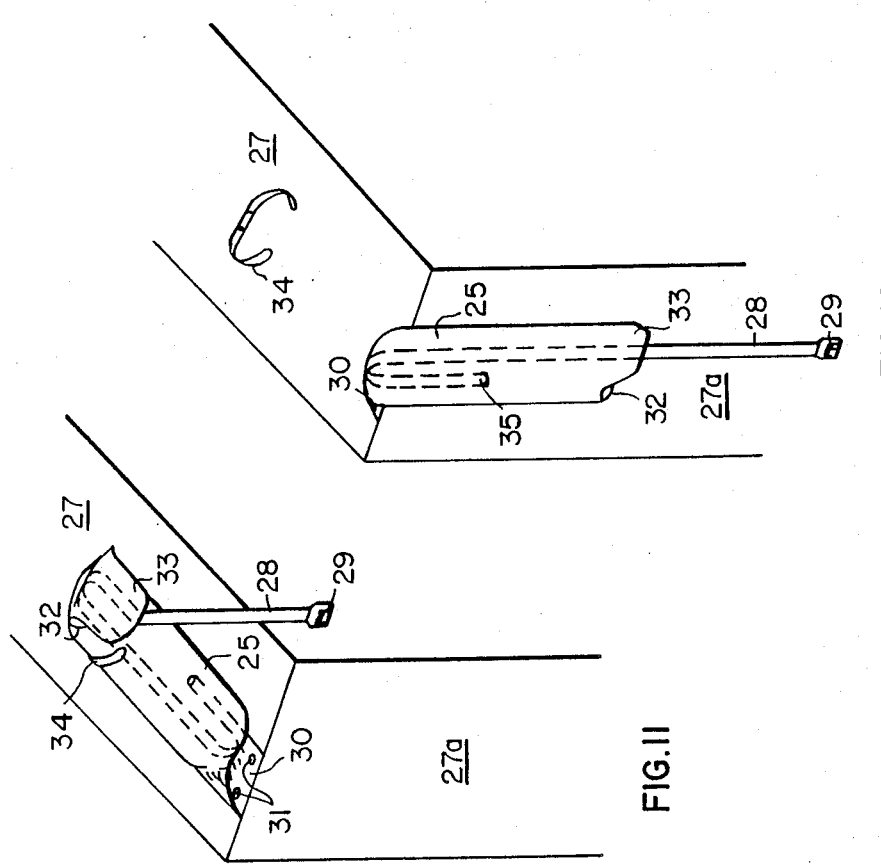
FIG. 12 shows the packing sack of FIG. 11 in a tilted position.
Figure 11:
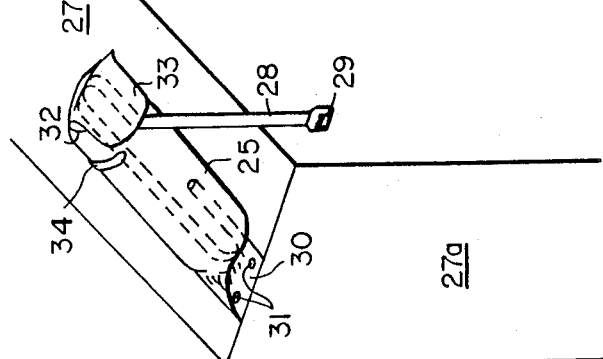
FIG. 11 shows a packing sack with a clamp.

FIGS. 11 to 13 show another embodiment of an individual packing sack 25 for a life jacket 26. The sack is arranged in a corner of an air or watercraft. The corner is formed by a horizontal ceiling 7 and a vertical wall 27a. FIG. 11 shows the arrangement in its state ready for use, whereby the closed end of the packing sack 25 forms a tab 30 which is secured to the wall 27 by two screws 31. The open end 32 is held in a horizontal position by a clamp 34 made of an elastic material and secured to the wall 27. The rip cord 28 with its handle 29 hangs downwardly ready for gripping. By pulling the rip cord 28 a strap 33 is opened and the packing sack 25 is released from the clamp 34. Thus, the packing sack 25 tilts downwardly and takes up the position shown in FIG. 12. Since the packing sack 25 encloses the life jacket relatively tightly, the latter cannot fall, due to friction, out of the packing sack 25. The rip cord 28 is again led around the upper end of the life jacket 26 within the packing sack 25 so that the life jacket will assume the position shown in FIG. 13 if the rip cord 28 is pulled further in order to pull the jacket completely out of the packing sack 25. The above mentioned arrangement is not dependent on a container so that the packing sacks 25 with the life jackets 26 may be arranged individually or in groups as may be required. The tab 30 may be connected by screws 31 to the vertical wall 27a. Instead of the snap buttons 9 or the screws 31, other attachment elements may be used, such as rapid closure means, expander rivets, or the like are conceivable.

Although the invention has been described with reference to specific example embodiments, it will be appreciated, that it is intended to cover all modifications and equivalents within the scope of the appended claims.

We claim:

1. A packing sack for a life jacket and for an easy access storage of said life jacket, in a craft, such as an aircraft, comprising a substantially hose shaped construction forming said packing sack with an open end (6, 32) and a closed end (7), said closed end (7) having a tab (8, 30) for receiving at least one securing element, a rip cord (14, 28) on the inside of said packing sack, said rip cord being secured to said packing sack, at a location intermediate the ends of said packing sack (2, 3, 4, 25), said rip cord leading from said location around that jacket end of a folded life jacket (16, 26) which faces away from said open end (6, 32) of said packing sack (2, 3, 4, 25), said rip cord further passing along the inner surface of the packing sack (2, 3, 4, 25) out through said open end (6, 32), and wherein said packing sack has such an inner dimension that a life jacket (16, 26) is safely held by friction inside said packing sack in a vertical position of said packing sack (2, 3, 4, 25) hanging with its open end (6, 32) downwardly.

2. The packing sack of claim 1, further comprising a strap (33) for closing the open end (6, 32) of said packing sack.

3. The packing sack of claim 1, further comprising means for securing said packing sack to a surface in said craft.

4. The packing sack of claim 3, wherein said means for securing said packing sack comprise a band (11) including band opening means (13), said band holding a free end of said packing sack.

5. The packing sack of claim 4, wherein said rip cord is arranged for first releasing said band opening means by pulling said rip cord to permit said packing sack to tilt downwardly into a position with its open end facing down, and to then pull said life jacket out of said packing sack.

6. The packing sack of claim 3, wherein said means for securing said packing sack comprise a clamp (34) for holding a free end of said packing sack.

7. The packing sack of claim 6, wherein said rip cord is arranged for first pulling said packing sack out of its clamp and then said life jacket out of said packing sack.

8. A combination of a container and at least one packing sack for a life jacket and for an easy access storage of said life jacket, in a craft, such as an aircraft, wherein said packing sack comprises a substantially hose-shaped construction forming said packing sack with an open end (6, 32) and a closed end (7), said closed end (7) having a tab (8, 30) for receiving at least one securing element, a rip cord (14, 28) on the inside of said packing sack, said rip cord being secured to said packing sack, at a location intermediate the ends of said packing sack (2, 3, 4, 25), said rip cord leading from said location around that jacket end of a folded life jacket (16, 26) which faces away from said open end (6, 32) of said packing sack (2, 3, 4, 25), said rip cord further passing along the inner surface of the packing sack (2, 3, 4, 25) out through said open end (6, 32), and wherein said packing sack has such an inner dimension that a life jacket (16, 26) is safely held by friction inside said packing sack in a vertical position of said packing sack (2, 3, 4, 25) hanging with its open end (6, 32) downwardly, and wherein said container encloses a space for holding said packing sack, said container further comprising at least one downwardly tiltable flap (5) for opening said container, and securing means for attaching said closed end (7) of said packing sack to said container, and means for holding said open end of said packing sack in a stored position in said container.

9. The combination of claim 8, further comprising a strap (33) for closing the open end (6, 32) of said packing sack.

10. The combination of claim 8, wherein said holding means of said container (1) comprise a clamp (34) for holding an open end (6, 32) of said packing sack in said stored position.

11. The combination of claim 8, wherein said holding means comprise a band including a surface zipper for holding an open end of said packing sack in said stored position.

12. The combination of claim 8, further comprising a rip cord arranged for first releasing said holding means and then to pull said life jacket out of said packing sack.

13. The combination of claim 8, further comprising means for securing said packing sack to a surface in said container.

* * * * *